United States Patent [19]

Sakamoto et al.

[11] 4,268,876
[45] May 19, 1981

[54] MAGNETIC REPRODUCING DEVICE

[75] Inventors: Hitoshi Sakamoto, Zama; Ryuichi Yamayoshi, Tokyo, both of Japan

[73] Assignee: Sony Corporation, Tokyo, Japan

[21] Appl. No.: 26,249

[22] Filed: Apr. 2, 1979

[30] Foreign Application Priority Data

Apr. 8, 1978 [JP] Japan ................................. 53-41616

[51] Int. Cl.³ ...................... G11B 21/08; G11B 15/18
[52] U.S. Cl. ...................................... 360/78; 360/10; 360/107
[58] Field of Search ...................... 360/78, 77, 10, 11, 360/107

[56] References Cited

U.S. PATENT DOCUMENTS

| 4,148,082 | 4/1979 | Okada et al. | 360/77 |
| 4,151,571 | 4/1979 | Cardot et al. | 360/77 |
| 4,163,993 | 8/1979 | Ravizza | 360/77 X |
| 4,165,521 | 8/1979 | Watanabe | 360/107 X |
| 4,167,763 | 9/1979 | Kubota | 360/77 |

FOREIGN PATENT DOCUMENTS

| 1410591 | 10/1975 | United Kingdom . |
| 1446255 | 8/1976 | United Kingdom . |
| 1519974 | 8/1978 | United Kingdom . |
| 1535914 | 12/1978 | United Kingdom . |

Primary Examiner—John H. Wolff
Attorney, Agent, or Firm—Lewis H. Eslinger; Alvin Sinderbrand

[57] ABSTRACT

A magnetic reproducing device, such as a helical scan VTR, for use with a magnetic tape having slant recorded tracks is provided with a system for determining tape address information. A magnetic head is supported on a bi-morph plate, and a circuit is provided for supplying a first drive signal to the bi-morph plate for positioning the head to rescan a given recording track on a tape and for supplying a second drive signal to the bi-morph plate for positioning the head to scan the next desired recorded track. A counter is provided to count the number of second drive signals and to provide tape address information based on that count.

8 Claims, 11 Drawing Figures

MAGNETIC REPRODUCING DEVICE

BACKGROUND OF THE INVENTION

2. Field of the Invention

This invention relates to a magnetic reproducing device, and more particularly to a magnetic reproducing device which includes a system for obtaining an address signal to identify specific fields and/or frames of a video signal recorded on a tape.

2. Description of the Prior Art

In order to edit video signals rapidly and precisely, it has been proposed in the prior art to record address signals on magnetic tape in addition to the video signal. The address signals can be written in various codes, but the SMPTE time code signal is recommended as an American National Standard, and the EBU time code signal is recommended as a standard code for 625 line/50 field television tape recordings. In the art, such code signals are recorded on a record medium along its longitudinal track and they can be read from the record medium over a fairly broad range of tape speeds. In the case where the record medium is stopped or transported at very low speeds, however, the reproduction of the time code signals becomes impossible. Upon editing a video tape by a video tape recorder, it is very advantageous for an editor to be able to choose individual frames presented visually at very low tape speeds, but the disadvantage of this method of operation is that the address of a chosen frame cannot be readily known with prior art systems. Further, when there are portions of the record media on which a time code signal is not recorded, or which contain drop-out, or when the time code signal cannot be reproduced because of head-clogging, the address of a chosen frame cannot be known.

In a video tape recorder having still and slow-motion reproduction modes, in order to obtain an address signal in such reproduction modes, it has been proposed to insert in the vertical blanking period of the recorded television signal a time code signal corresponding to an address. Such a time code signal is most suitable for a VTR, such as that, proposed in the U.S. Patent Application Ser. No. 677,815, in which a reproduced signal without guard band noise can be obtained regardless of the tape speed and tape running direction. However, since the vertical blanking signal is positioned on the end portion of the recorded track, there is a possibility that it will not be properly reproduced in the slow or still mode. When a magnetic head is positioned near an end portions of a recorded track, the contact condition between the magnetic head and the magnetic tape is deteriorated, and accordingly, there is an increased possibility that the vertical blanking signal cannot be reproduced.

SUMMARY OF THE INVENTION

An object of this invention is to provide a magnetic reproducing device which includes a circuit to obtain a tape address signal even while the tape is being reproduced in a slow motion reproduction mode.

Another object of this invention is to provide a magnetic reproducing device which includes a circuit for accurately maintaining a tape address signal while an address signal recorded on the tape cannot be read.

According to an aspect of the invention a magnetic reproducing device for use with a magnetic tape having slant recorded tracks comprises means for moving the tape, a magnetic head for scanning each of the recorded tracks on the tape to reproduce a signal, means for deflecting the magnetic head transversely to each of the recorded tracks, means for supplying a first drive signal to the deflecting means for positioning the magnetic head to rescan a desired one of the recorded tracks, means for selectively supplying a second drive signal to the deflecting means for positioning the magnetic head to scan the next desired one of the recorded tracks, and means for counting the number of second drive signals.

According to another aspect of the invention, the magnetic tape with which the reproducing device is to be used further includes address signals recorded along the longitudinal direction of the tape and the reproducing device further includes means for reading out the address signals. In one preferred embodiment means are provided for detecting when the address signals cannot be read from the tape and a circuit is provided for correcting the read-out of such address signals with the output of the counting means when there is an indication that the address signals cannot be read.

Other objects, features, and advantages of the present invention will be apparent from the following description taken in conjunction with the accompanying drawings.

BRIEF DESCRIPTION OF THE DRAWINGS

FIG. 4-A shows change of supply voltage to the bi-morph;

FIG. 4-B to FIG. 4D show a reproduced vertical synchronizing signal, an external reference vertical synchronizing signal and a phase-shifted external reference vertical synchronizing signal, respectively;

FIG. 6-B is a waveform chart of a supply voltage to the bi-morph in the case of FIG. 6-A;

FIG. 7-A is a partial plan view of a tape showing recorded tracks and head scanning paths on ½-slow-speed reverse reproduction; and FIG. 7-B is a waveform chart of a supply voltage to the bi-morph in the case of FIG. 7-A.

DESCRIPTION OF THE PREFERRED EMBODIMENT

Figure 1:
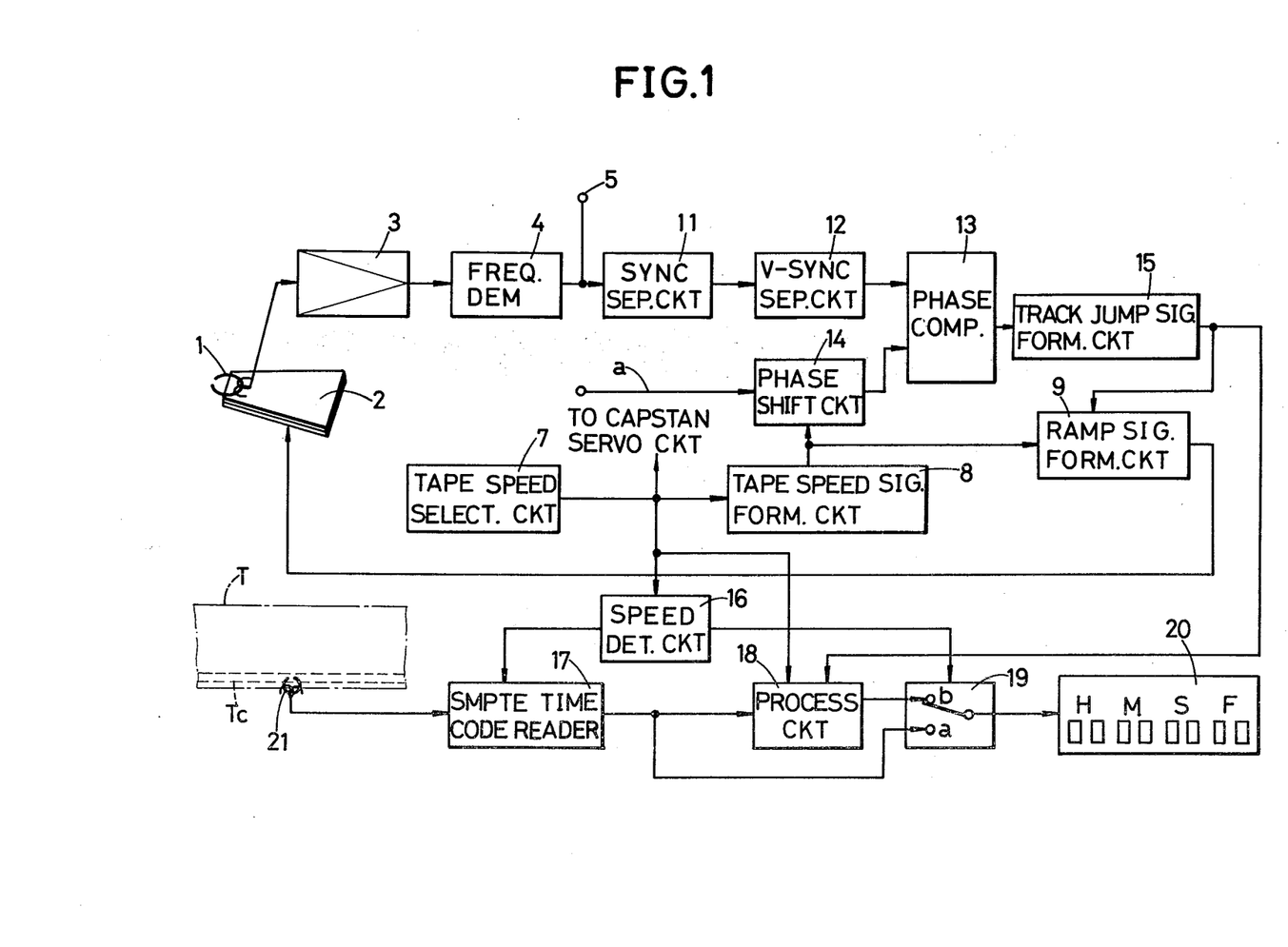
FIG. 1 is a block diagram of a head tracking control system of a VTR according to one embodiment of this invention.

FIG. 1 is a block diagram of a head tracking control system according to one embodiment of this invention. In FIG. 1, a rotational magnetic head 1 for a helical scanning type VTR is supported on a rotary head drum (not shown) through a deflector, for example, a bi-morph plate 2. The magnetic head 1 is deflected transversely to the scanning track on a magnetic tape. Tape transport speed is selected through a tape speed selecting circuit 7. The output of the circuit 7 is supplied to a capstan servo circuit (not shown) for controlling the tape transportation, and is supplied to a tape speed signal forming circuit 8. A tape speed signal formed in the circuit 8 is supplied to a ramp signal forming circuit 9, which supplies a ramp voltage signal according to the tape speed, as shown, for example, in FIG. 2, to the bi-morph plate 2.

Figure 2:
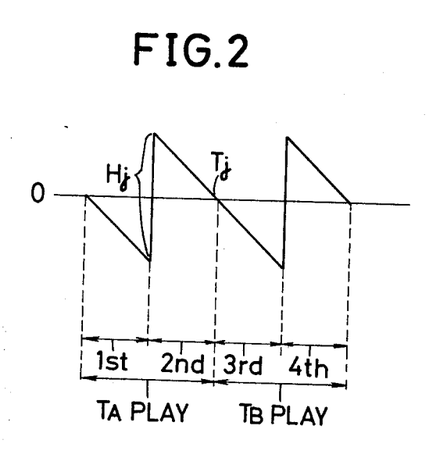
FIG. 2 is a voltage waveform to be supplied to bi-morph on ½-slow-motion reproduction.
Figure 3:
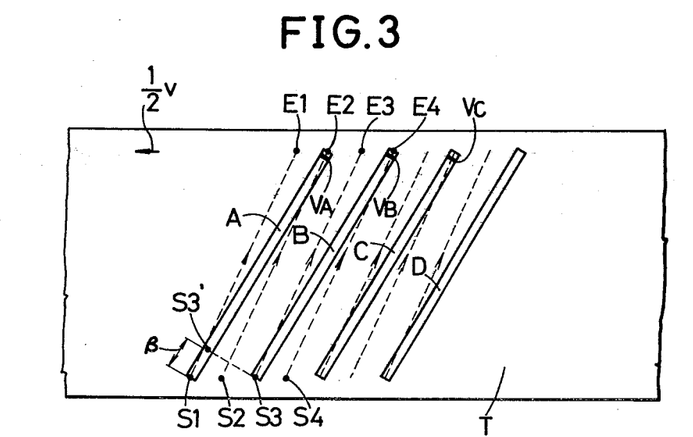
FIG. 3 is a partial plan view of a tape showing recorded tracks and head running paths thereon on ½-slow-motion reproduction.

FIG. 2 shows a voltage waveform to be supplied to the bi-morph plate 2 in the case where the tape is transported at $\frac{1}{2}$ speed for $\frac{1}{2}$-slow-motion reproduction. FIG. 3 shows recorded tracks on a magnetic tape T. Recorded tracks A, B, etc. are formed on the tape T with a predetermined skew angle. When the tape T is transported at $\frac{1}{2}$ speed in the direction shown by an arrow on the figure, the head 1 would scan the surface of the tape along dotted lines in FIG. 3 if it were not deflected by bi-morph 2. Namely, without deflection, the head would scan at a predetermined angle from a start position S1 to an end position E1, from S2 to E2, etc., ending the scan of each track at a position which is removed from the end of that track by $\frac{1}{2}$ the distance, or pitch, between adjacent tracks.

Therefore, in the first scanning from S1 to E1, a ramp voltage sloped to negative, as shown in FIG. 2, is supplied to the bi-morph plate 2 to deflect the head 1 gradually downward. At the end of the first scanning, the head 1 is deflected to the position E2 by $\frac{1}{2}$ the pitch between adjacent tracks. The second scanning starts at the position S3 removed by 1 pitch from S1, because the tape T has moved by $\frac{1}{2}$ pitch and the head 1 has been deflected by $\frac{1}{2}$ pitch during the first scanning. Accordingly, the head 1 must be removed to the start position S1 to scan again the track-A. Therefore, a positive voltage Hj (hereinafter referred as the "head jump signal") is supplied to the bi-morph plate 2 to deflect the head 1 upward by one pitch at the start of the second scanning. During the second scanning, a ramp voltage waveform sloped to negative is given to the bi-morph plate 2 to deflect the head 1 downward by $\frac{1}{2}$ pitch in the same manner as during the first scanning. The third scanning starts at the same position S3 as the second scanning. However, if a positive head jump signal Hj is given to the bi-morph plate 2 in the same manner as the second scanning, the bi-morph plate 2 may be deflected beyond its allowable deflection range. It should be noted that the deflection amplitude of the bi-morph plate 2 shows approximately zero at the start of the third scanning, and further, the head 1 is positioned at the first end S3 of the track-B at that time. Accordingly, without supplying the head jump signal Hj to the bi-morph plate 2 at the start of the third scanning, the scanning track is altered from A to B. The change of scanning tracks is hereinafter referred as "track jump". After that, a ramp voltage sloped to negative is supplied to the bi-morph plate 2 so that the head 1 traces the track B. Another signal, that is hereinafter referred as the "track jump signal Tj", is formed for restricting head jump and thus for altering the scanning track. Thereafter, the same sequential scanning operations are repeated.

In this embodiment, a phase difference between a specified positional signal recorded at a predetermined position on each record track and a reference signal is detected to decide whether the track jump is required or not. When a bias voltage is applied to the bi-morph plate 2 at the first end S3 of the track-B to scan the track-A, the head 1 begins the scanning at a position shifted by a distance $\beta$ from the first end S1 of the track-A. The distance $\beta$ is called "H-alignment" which is represented by the number that the times of period H of the horizontal synchronizing signal, would be recorded on an equivalent length of recording track as $\beta=2.5H$ for example. Accordingly, the time required for the head 1 to reach a specified position, for example, a position $V_A$, $V_B$ or $V_C$ on which a vertical synchronizing signal is recorded, from the scanning start position, depends on the deflection amplitude of the bi-morph plate 2. In the above example of FIG. 3, the vertical synchronizing signal is reproduced earlier by the time approximately corresponding to 2.5H than in the undeflected reproduction. Accordingly, it can be decided by the phase of the signal at the specified position of the recording track whether the track jump is required or not.

In FIG. 1, a reproduced signal obtained through the head 1, a reproducing amplifier 3, and a frequency demodulator 4 is led out from an output terminal 5 to a not-shown external reproducing system. It is further supplied to a synchronizing signal separating circuit 11 for separating the synchronizing signal. A separated synchronizing signal is supplied to a vertical synchronizing signal separating circuit 12 for separating the vertical synchronizing signal. The separated vertical synchronizing signal is supplied to a phase comparator 13. To another input of the phase comparator 13, an external reference vertical synchronizing signal is supplied through a phase shift circuit 14. The output of the phase comparator 13 is supplied to a track jump signal forming circuit 15 for forming the track jump signal or the head jump signal. The track jump signal is supplied to the ramp signal forming circuit 9, in which the ramp waveform as shown in FIG. 2 is formed for controlling the bi-morph plate 2 to perform the tracking, track jump Tj and head jump Hj. The inclination of the ramp waveform formed in the ramp signal forming circuit 9 corresponds to the angle of undeflected scanning path of the head 1 relative to the recorded track.

The phase of the reproduced video signal obtained from each track depends on the tape running speed, so that the time base error included in the video signal may become too large to be corrected with a circuit means. Therefore, in this embodiment, the phase shift circuit 14 is provided to adjust the phase of the external reference vertical synchronizing signal in accordance with the tape running speed before being compared with the reproduced vertical synchronizing signal in the phase comparator 13. Namely, as shown in FIG. 1, the phase adjustment in the phase shift circuit 14 is controlled in accordance with the output of tape speed signal forming circuit 8.

Figure 4:
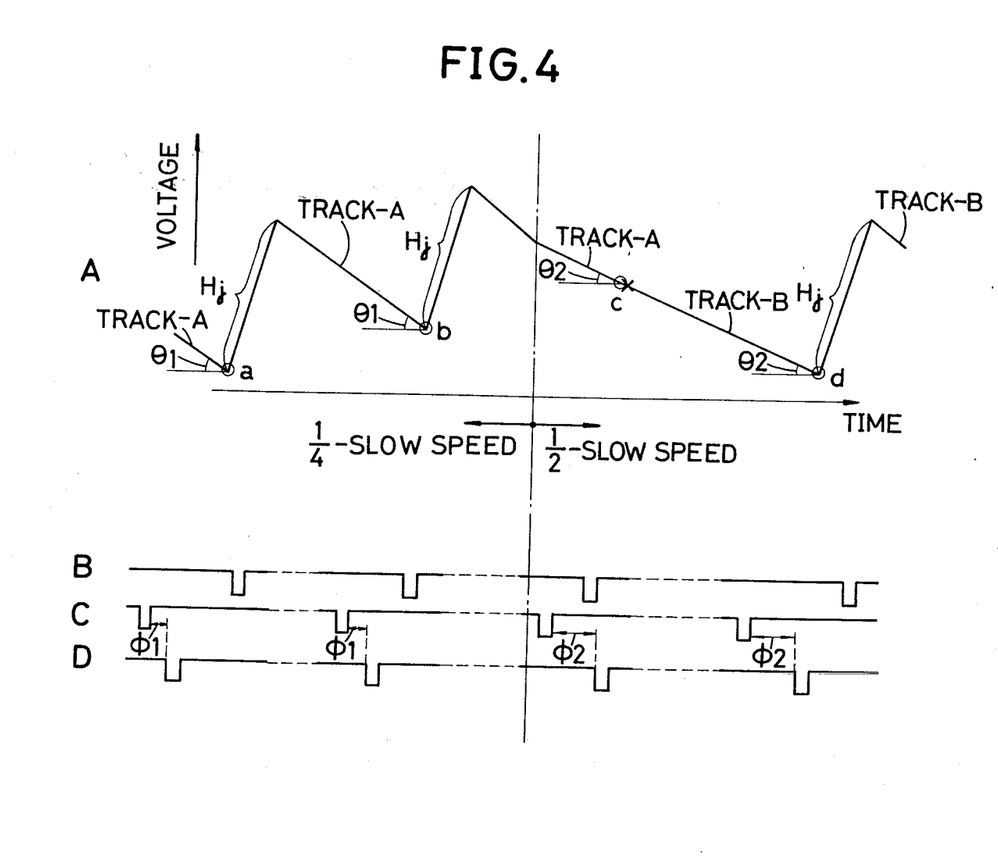
FIG. 4 shows waveforms for explaining operations of the tracking control system of FIG. 1 when the VTR is changed over from ¼-slow-motion reproduction to ½-slow-motion reproduction.

Next, an operation of the head tracking control system of FIG. 1 will be described on referring to an example shown in FIG. 4. The example shows a case where the VTR is changed over from the $\frac{1}{4}$-slow-motion reproducing mode into the $\frac{1}{2}$-slow-motion reproducing mode while the signals are reproduced from the recorded track-A (FIG. 3), and immediately thereafter the track jump of the head onto the recorded track-B (FIG. 3) is effected. FIG. 4-A shows the change of the output of the ramp signal forming circuit 9 (which is the supply voltage to the bi-morph plate 2). FIG. 4-B to FIG. 4-D show the reproduced vertical synchronizing signal B, the external reference vertical synchronizing signal C and the shifted external vertical synchronizing signal D which occur immediately before the completion of scanning each recorded track (at the times a, b, c and d indicated by small circles in FIG. 4-A).

Since the tape speed at the times a and b is constant at ½-slow speed, the phase of the external reference vertical synchronizing signal of FIG. 4-C is shifted by a constant $\phi_1$ both at the times a and b in accordance with the output of the tape speed signal forming circuit 8, as shown in FIG. 4-D. The phase shift $\phi_1$ corresponds to the inclination $\theta_1$ of the ramp waveform of the supply voltage to the bi-morph. The reproduced vertical synchronizing signal B lags behind the shifted external reference vertical synchronizing signal of FIG. 4-D both at the times a and b. Accordingly, the head jump signal is formed in the track jump signal forming circuit 15 in accordance with the output of the phase comparator 13. The head jump signal is supplied to the ramp signal generating circuit 9 so that the head jump voltage Hj shown in FIG. 4-A is formed to effect the head jump.

At the time c, the VTR is already changed over into the ½-slow motion reproducing mode. Accordingly, the external reference vertical synchronizing signal is shifted by a phase $\phi_2$ corresponding to the inclination $\theta_2$ of the supply voltage to the bi-morph. In this case, since the shifted external reference vertical synchronizing signal lags behind the reproduced vertical synchronizing signal, the track jump signal Tj is formed. Therefore, the head jump is not effected at the time c so that the head 1 scans the track-B without change of inclination of the supply voltage to the bi-morph.

At the time d, the reproduced vertical synchronizing signal lags behind the external vertical synchronizing signal as shifted by the phase $\phi_2$. The head jump signal Hj is generated in the track jump signal forming circuit 15.

Figure 5:
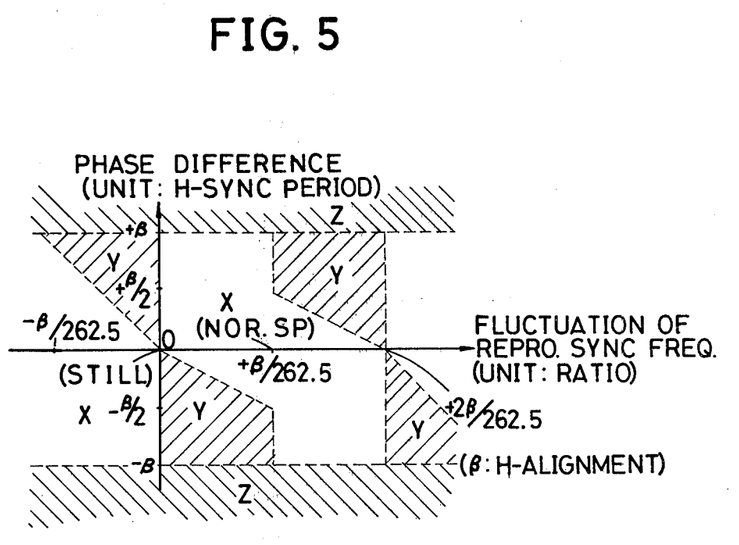
FIG. 5 is a graph showing the amount of phase shift provided by the phase shift circuit of FIG. 1.

According to this embodiment, the phase shift amount of the phase shift circuit 14 is so designed as to be determined by the relationship shown in FIG. 5. In FIG. 5, an abscissa represents the fluctuation of the reproduced synchronizing frequency in unit of $\beta/262.5$. In this case, one field of video signals includes 262.5 of horizontal synchronizing pulses, and $\beta$ represents the H-alignment ($\beta=2.5H$). The fluctuations of the reproduced synchronizing frequency corresponds to the variation (so called jitter) of the horizontal scanning frequency caused by the angular difference between the recorded track and the scanning path. Therefore, the abscissa of FIG. 5 has a scale corresponding to the tape running speed. The fluctuation of the reproduced synchronizing frequency amount to zero, $+\beta/262.5$, $+2\beta/262.5$ and $-\beta/262.5$, in the still reproducing mode, the normal (1/1-motion) reproducing mode, 2/1-fast-motion reproducing mode, and reverse reproducing mode, respectively. In FIG. 5, an ordinate represents the phase difference of the specified signal (for example, vertical synchronizing signal) in units of H (horizontal synchronizing periods). When the phase difference is put in the hatched region Y, with respect to the range from the still reproducing mode to the normal reproducing mode for the abscissa, the track jump is effected, and so the phase difference is returned to the region X. The phase of the external reference vertical signal is shifted by the phase shift circuit 14, which is controlled by the output of the tape speed signal forming circuit 8, so that the phase shift amount varies in accordance with the dotted boundary line between the regions X and Y. The dotted boundary line defining the Y-region is obtained from the condition that the range of the variation of the phase difference is narrow at each of the tape running speeds, and moreover is equally distributed on both the positive and negative sides of the phase difference. The regions Z in FIG. 5 are provided to detect the phase difference between the reproduced vertical synchronizing signal and the external reference vertical synchronizing signal for performing a track jump as large as 2Hj.

Figure 6A:
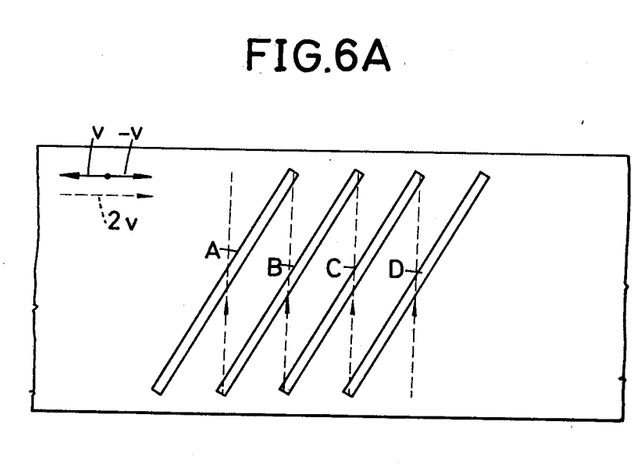
FIG. 6A is a partial plan view of a tape showing recorded tracks and head scanning paths on reverse reproduction.
Figure 6B:
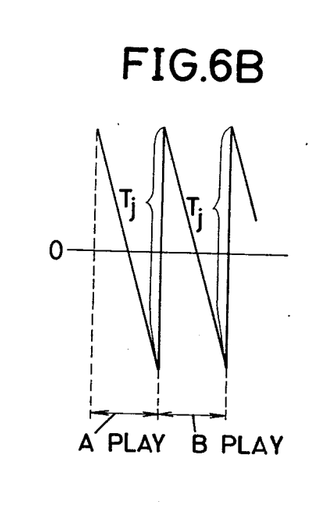

FIG. 6-A shows the recorded tracks and head scanning paths on the tape upon a reverse reproduction. FIG. 6-B shows a voltage waveform to be supplied to the bi-morph. The tape is fed at the speed of $-v$ on reverse reproduction, so that the tape running speed is varied by 2v from that for normal reproduction, as shown in FIG. 6-A. Accordingly, unless the bi-morph is deflected, the end of each head scanning path will be shifted by 2-pitches from the end of its respective recorded track. Therefore, a ramp voltage having an amplitude of 2Hj to deflect the head by 2 pitches is required on every scanning, and further, a track jump Tj of amplitude 2Hj is required to alter the scanning track after scanning each track.

Figure 7A:
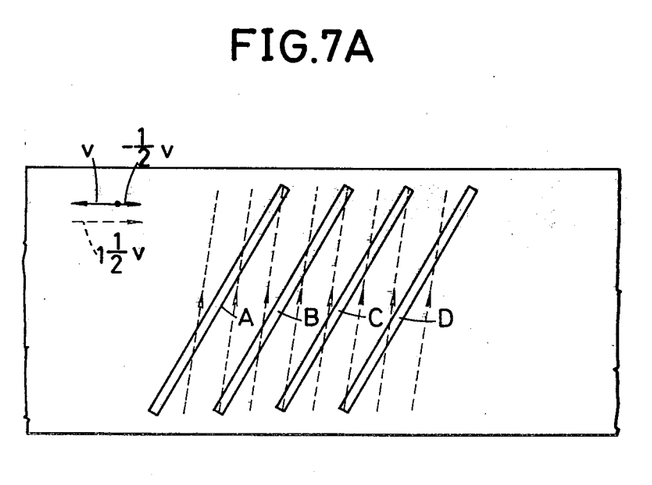
Figure 7B:
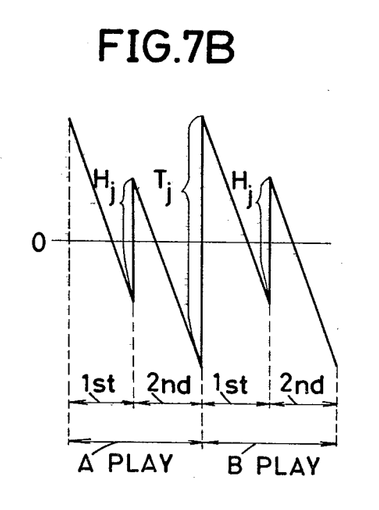

FIG. 7-A shows the recorded tracks and head scanning paths on the tape upon ½-slow-speed reverse reproduction. FIG. 7-B shows a voltage waveform to be supplied to the bi-morph. The tape is fed at the speed of $-\frac{1}{2}v$, so that the tape running speed is varied by 1½v from that for normal reproduction, as shown in FIG. 7-A. Accordingly, unless the bi-morph is deflected the end of each head scanning path is shifted by 1½ pitches from the end of its respective recorded track. Therefore, a ramp voltage having an amplitude of 1½Hj to deflect the head by 1½ pitches is required on every scanning, and further, a head jump Hj to deflect the head by one pitch and a track jump Tj ($=2Hj$) to deflect the head by 2 pitches are alternately required after scanning each track.

The inventors of this invention conceived that a relative address or position of a scanning track can be determined by detecting the number of the track jump signals in a VTR having the above head tracking control system because the scanning track is altered at each track jump. Therefore, in combination with a conventionally known address detecting circuit, an absolute address of a scanning track can be determined. A part of FIG. 1 for displaying a time code showing the absolute address of the scanning track will be described hereinafter.

As shown in FIG. 1, a time code track TC is formed on the tape T along the longitudinal direction thereof. SMPTE time codes are recorded on the time code track correspondingly to each recording track. The time code is reproduced through a magnetic head 21, the output signal of which is supplied to a SMPTE time code reader 17 to be decoded to a time signal. The time signal is supplied to a terminal a of a change-over switch 19, which is controlled in accordance with a change-over signal formed in a speed detecting circuit 16 for detecting tape running speed.

When the tape runs at a speed higher, for example, than ½-slow-speed, the output of the tape speed selecting circuit 7 is descriminated in the speed detecting circuit 16. The change-over switch 19 is switched to the terminal a by the change-over signal from the speed detecting circuit 16. Accordingly, the time signal obtained from the SMPTE time code reader 17 is supplied to a display unit 20, on which the address of the scanning track is displayed as "12 hours, 30 minutes, 01 second, 15 frames", for example.

When the tape speed is changed over to another running speed below ½-slow-speed, the speed detecting circuit 16 detects the change. The change-over switch 19 is changed-over to another terminal b with the change-over signal of the speed decting circuit 16. At the point of time when the tape speed is changed over, the output of the SMPTE time code reader 17 is held therein in response to the output of the speed detecting circuit 16. Therefore, at the speed below ½-slow-speed, the time signal held in the SMPTE time code reader 17 is supplied to the display unit through a process circuit 18 and the terminal b of the change-over switch 19. To another input of the process circuit 18, the track jump signal is supplied from the track jump signal forming circuit 15.

Thus, the output of the time code reader 17 is displayed, compensated in accordance with the track jump signal. When the tape runs in the ordinary direction at a speed less than ½-slow-speed, the track jump signal is formed at every track or at every TV field. The track jump signal is used in this case as a signal for preventing head jump or bi-morph resetting. Therefore, an addition of 1 (one) to the frame signal portion of the time signal from the time code reader 17 is performed in the process circuit 18 once, whenever two track jump signals are formed. Similarly, when the tape runs in the reverse direction at a speed less than ½-slow-speed, the track jump signal is formed at every TV field. In this case, the track jump signal is used as a resetting signal of the bi-morph plate 2, which is two times (2Hj) as large as head jump signal Hj. Therefore, a subtraction of 1 (one) from the frame signal portion is performed in the process circuit 18 once per two track jump signals. The functions of the addition and subtraction in the process circuit 18 are changed over in accordance with the output of the tape speed selecting circuit 7.

The process circuit 18 may include an arithmetic circuit. Alternatively, a reversible counter may be used. When the time code is required to be displayed with the minimum unit of one field, the addition or subtraction may be performed with every track jump signal.

When a VTR is not provided with the SMPTE time code reader, a reversible counter may be used for the process circuit 18 to count the track jump signals. A relative address of each track can be represented by a counting output with number of fields, within the tape speed range upto a tape speed at least as high as the normal tape running speed in the ordinary direction and reverse direction.

Though the change-over switch 19 is controlled by the output of the speed detecting circuit 16 in the above embodiment, the switch may be changed over with an output of a detector which detects the condition that the time code is not detected in the SMPTE time code reader 17. Such construction may prevent trouble when the address or time code can't be read because of signal drop-out or because no time code signal has been recorded.

Further, although the output of the switch 19 is used for visually displaying, in unit 20, the address along tape T at which head 1 is scanning the tape, such output or signal from switch 19 may be compared with a signal representing a pre-selected address for controlling the VTR, for example, stopping the tape transport or changing over the VTR for reproducing mode to recording mode at a predetermined position or address of the tape as indicated by coincidence of the compared signals.

Though the SMPTE time code is used as the address signal in the above embodiment, another address signal according and reproducing system may be used, where a time code signal is recorded with a recording video signal in the vertical blanking period thereof. For example, VITC (Vertical Internal Time Code) disclosed in the U.S. Pat. No. 4,159,480, may be used as the address signal. In this case, preferably, the time code representing the address of each recorded track may be displayed on the basis of the SMPTE time code in the tape speed range higher than 2/1-fast-speed, on the basis of VITC in the tape speed range from 2/1-fast-speed to ½-slow-speed, and on the basis of a time signal compensated with the track jump signal in the tape speed range lower than ½-slow-speed.

Further, though the track jump signal is formed in accordance with the result of phase comparison between the reproduced vertical synchronizing signal and the external reference vertical synchronizing signal, the track jump signal may be formed on the basis of an output of a monitor which is provided to detect the condition of track jump by monitoring the position of the deflected bi-morph plate 2 as in the VTR disclosed in the U.S. Patent Application Ser. No. 677,815, of Hathaway et al.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

What is claimed is:

1. A magnetic reproducing device for use with a magnetic tape having signals recorded thereon in parallel tracks which extend obliquely in respect to the longitudinal direction of the tape comprising means for moving said tape at a selected speed in said longitudinal direction; a magnetic head for scanning said tracks so as to reproduce the respective signals recorded therein; deflecting means for deflecting said magnetic head in directions extending transversely to the direction along each of said recorded tracks; means for supplying a first drive signal to said deflecting means for positioning said magnetic head to repeat the scanning of one of said tracks; means for selectively supplying a second drive signal to said deflecting means for positioning said head to scan the next desired one of said tracks, and counting means for counting said second drive signals as a measure of the distance said tape is moved in said longitudinal direction, which measure is accurate independently of said selected speed.

2. A magnetic reproducing device according to claim 1, further including means for displaying a value which varies as a function of the number of said second drive signals counted by said counting means.

3. A magnetic reproducing device according to claim 2, in which said tape with which the device is to be used further has address signals recorded along the longitudinal direction of said tape, and further including means for reading out said address signals.

4. A magnetic reproducing device according to claim 3, further including means for supplying said read-out address signal to said displaying means.

5. A magnetic reproducing device according to claim 4, including a correcting circuit for correcting said read-out address signal with the output of said counting means.

6. A metnetic reproducing device according to claim 5, further including means for detecting tape speed, and in which said correcting circuit is operated when said tape speed detecting means indicates that the tape speed is lower than a predetermined speed.

7. A magnetic reproducing device according to claim 6, further including means for storing the last read-out address signal which has been read-out by said address signal read-out means before said correcting circuit is operated, and in which said correcting circuit adds the output of said counting means to said last read-out address signal.

8. A magnetic reproducing device according to claim 5, further including detecting means for detecting when said address signal cannot be read out, and in which said correcting circuit is operated when said detecting means indicates said address signals cannot be read out.

* * * * *